(12) United States Patent
Nogami

(10) Patent No.: US 10,967,264 B2
(45) Date of Patent: Apr. 6, 2021

(54) NON-TRANSITORY COMPUTER-READABLE MEDIUM, CONTROL METHOD, SERVER DEVICE, AND TERMINAL DEVICE TO CARRY OUT LOTTERIES IN SOCIAL GAMES

(71) Applicant: POKELABO, Inc., Tokyo (JP)

(72) Inventor: Yusuke Nogami, Tokyo (JP)

(73) Assignee: POKELABO, Inc., Tokyo (JP)

( * ) Notice: Subject to any disclaimer, the term of this patent is extended or adjusted under 35 U.S.C. 154(b) by 92 days.

(21) Appl. No.: 16/172,292

(22) Filed: Oct. 26, 2018

(65) Prior Publication Data
US 2019/0126147 A1    May 2, 2019

(30) Foreign Application Priority Data

Oct. 27, 2017    (JP) .............................. JP2017-208462

(51) Int. Cl.
| | |
|---|---|
| *A63F 13/69* | (2014.01) |
| *A63F 13/822* | (2014.01) |
| *A63F 13/48* | (2014.01) |
| *A63F 13/35* | (2014.01) |
| *A63F 13/795* | (2014.01) |

(52) U.S. Cl.
CPC .............. *A63F 13/48* (2014.09); *A63F 13/35* (2014.09); *A63F 13/69* (2014.09); *A63F 13/795* (2014.09); *A63F 13/822* (2014.09)

(58) Field of Classification Search
None
See application file for complete search history.

(56) References Cited

U.S. PATENT DOCUMENTS

| | | | | |
|---|---|---|---|---|
| 2008/0004094 A1* | 1/2008 | Mueller | ................... | G07F 17/32 463/1 |
| 2013/0337906 A1* | 12/2013 | Ikeda | ...................... | A63F 13/69 463/29 |

(Continued)

FOREIGN PATENT DOCUMENTS

| | | |
|---|---|---|
| JP | 2013-156743 A | 8/2013 |
| JP | 2014-68728 | 4/2014 |
| JP | 2015-173777 A | 10/2015 |

OTHER PUBLICATIONS

Office Action dated Oct. 2, 2018 in Japanese patent Application No. 2017-208462, 6 pages with English translation.

(Continued)

*Primary Examiner* — Damon J Pierce
(74) *Attorney, Agent, or Firm* — Oblon, McClelland, Maier & Neustadt, L.L.P.

(57) ABSTRACT

A server device determines a selected game content from among the multiple game media base on a request from a user belonging to one team, and if the selected game content is a first selected game content whose associated attribute is of a specified content and a returnable condition is met, displays the first selected game content to the user in a state in which the user can select return or acquisition of the first selected game content. The server device, if the user selects return of the first selected game content, stores, in the memory and in association with the user, a game content that is different from the multiple game media, and if the user selects acquisition of the first selected game content, stores, in the memory and in association with the user, the first selected game content.

10 Claims, 13 Drawing Sheets

(56) References Cited

U.S. PATENT DOCUMENTS

| | | | |
|---|---|---|---|
| 2015/0157941 A1* | 6/2015 | Ando | A63F 13/58 463/43 |
| 2016/0051896 A1* | 2/2016 | Hakuta | A63F 13/35 463/42 |
| 2018/0322518 A1* | 11/2018 | Kim | G06Q 30/0209 |

OTHER PUBLICATIONS

Japanese Office Action dated Feb. 18, 2020 in Patent Application No. 2019-023939.

Reference previously filed, summiting English translation only of the Japanese Office Action dated Feb. 18, 2020, in Japanese Patent Application No. 2019-023939, 2 pages.

* cited by examiner

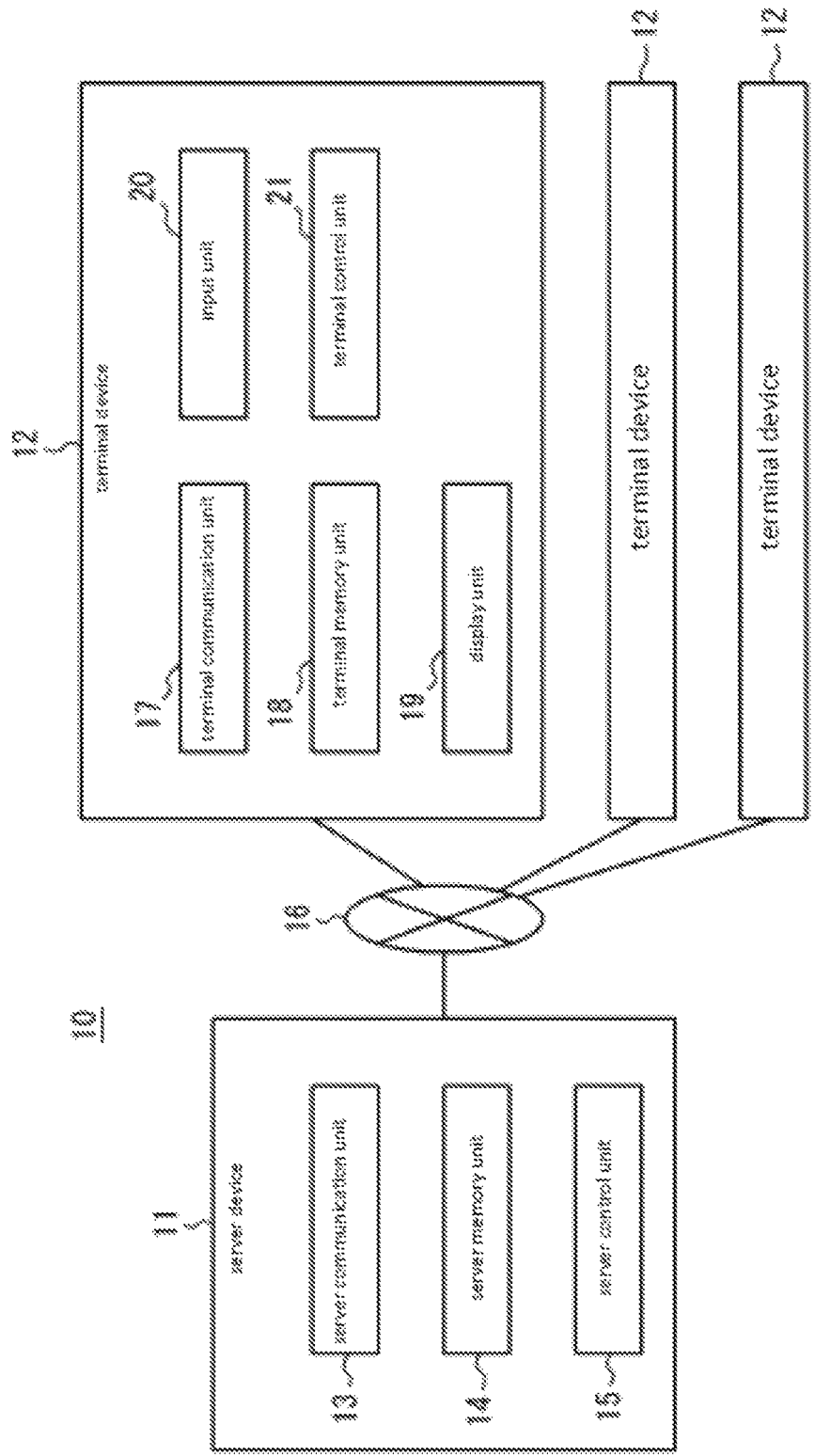
[FIG. 1]

[FIG. 2]
| User ID | Owned card information |
|---------|------------------------|
| user01  | * * * *                |
| user02  | * * * *                |
| user03  | * * * *                |
| ⋮       | ⋮                      |

[FIG. 3]
| Card ID | Item | Level | Reality | Fighting characteristics | Attack power | Defense power | Skill |
|---|---|---|---|---|---|---|---|
| 1 | S | 1 | 2 | Fire | 1000 | 1000 | Full-scale attack |
| 2 | T | 5 | 3 | Water | 2000 | 2000 | One-body attack |
| 3 | U | 10 | 4 | Wind | 3000 | 3000 | One-body recovery |
| 4 | V | 3 | 4 | Wind | 3000 | 3000 | Full-scale recovery |
| ... | ... | ... | ... | ... | ... | ... | ... |
111

[FIG. 4]

| Job ID | Job type | Character | Level | ... |
|--------|----------|-----------|-------|-----|
| J1 | Warrior | A | 3 | ... |
| J2 | Magician | Z | 1 | ... |
| J3 | Magician | A | 7 | ... |
| ⋮ | ⋮ | ⋮ | ⋮ | ⋮ |

112

[FIG. 5]
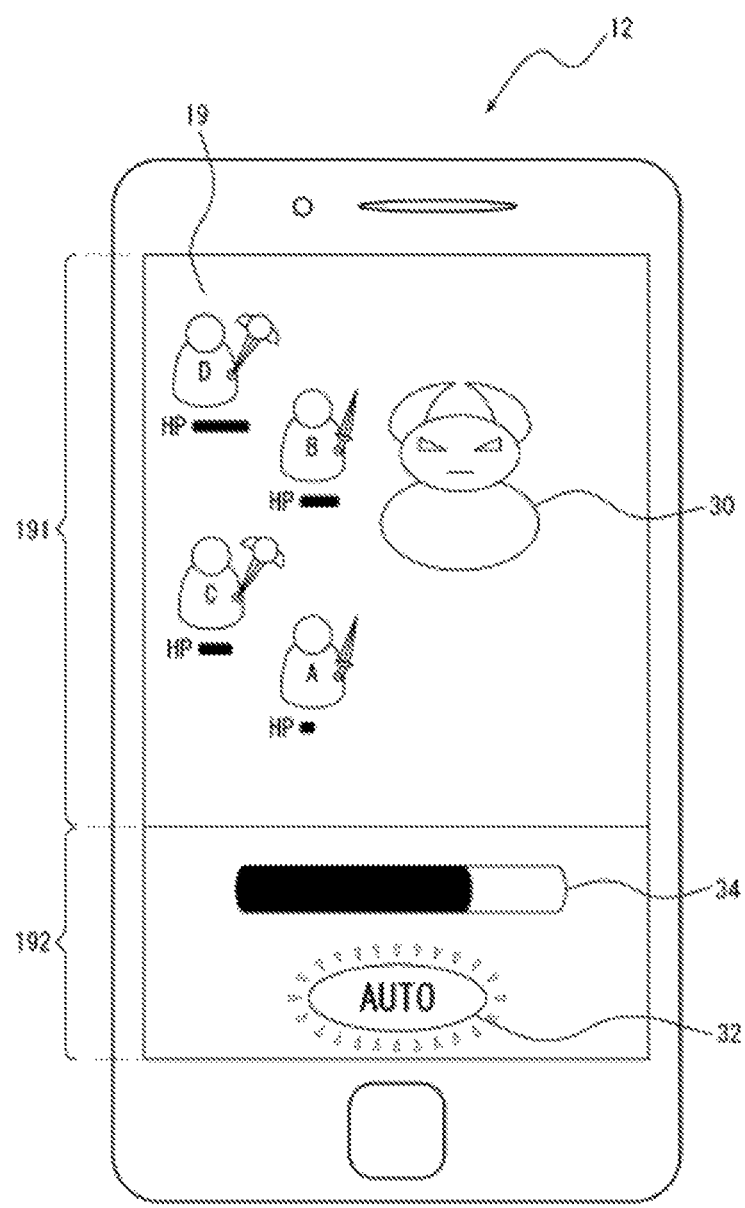

[FIG. 6]
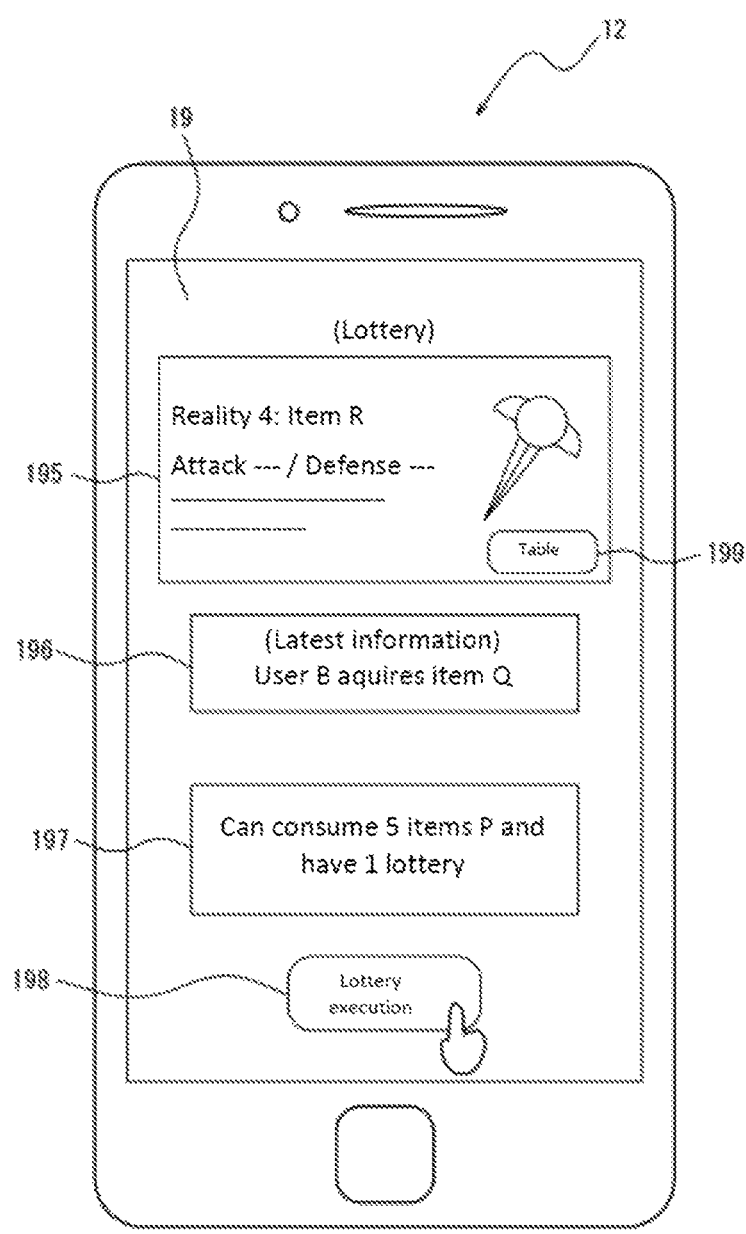

[FIG. 7]
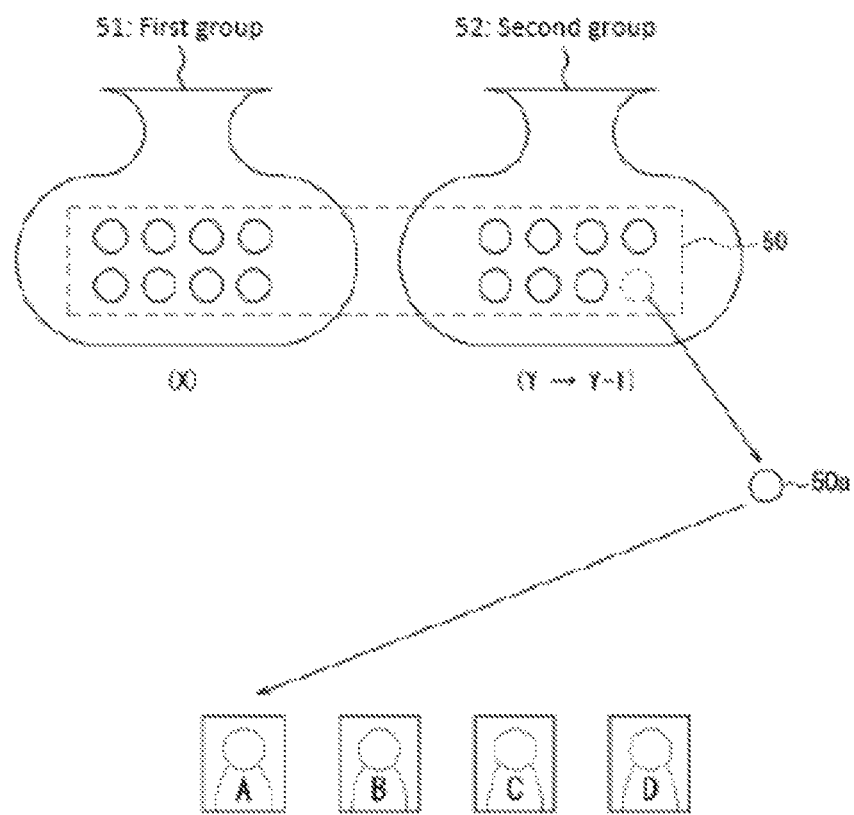

[FIG. 8]
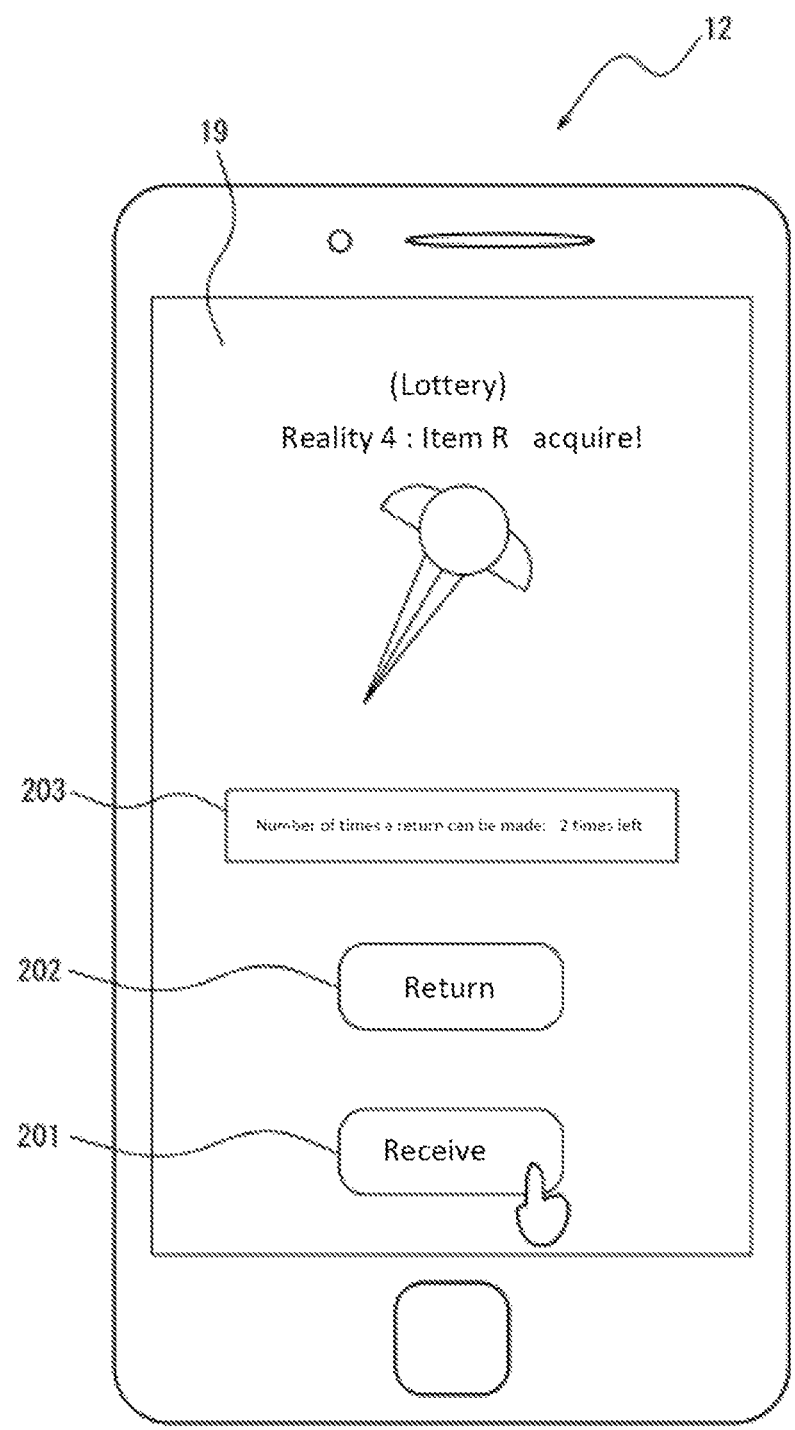

[FIG. 9]
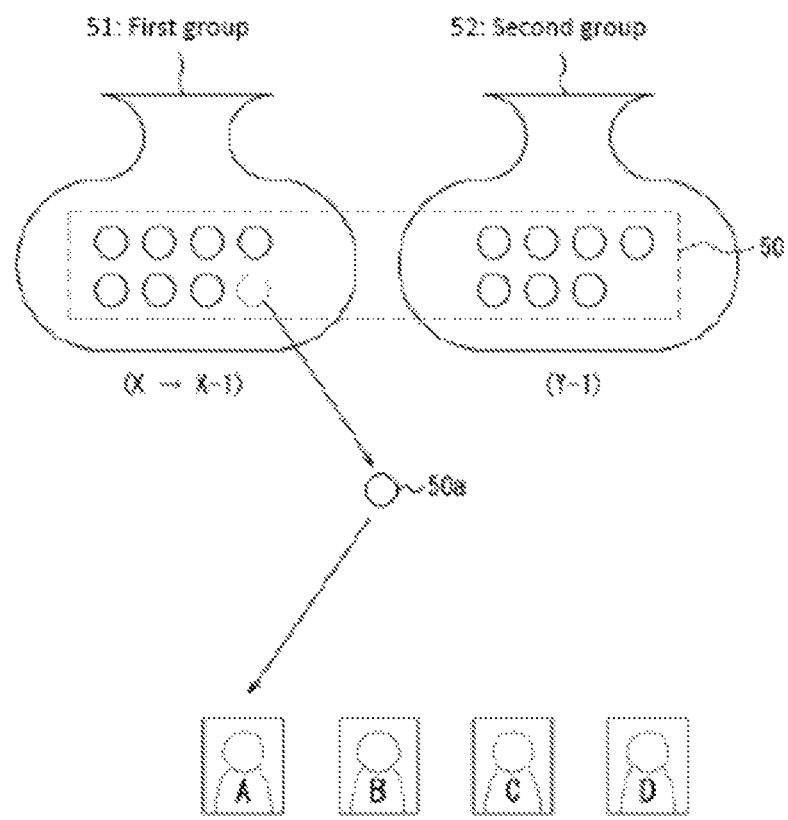

[FIG. 10]
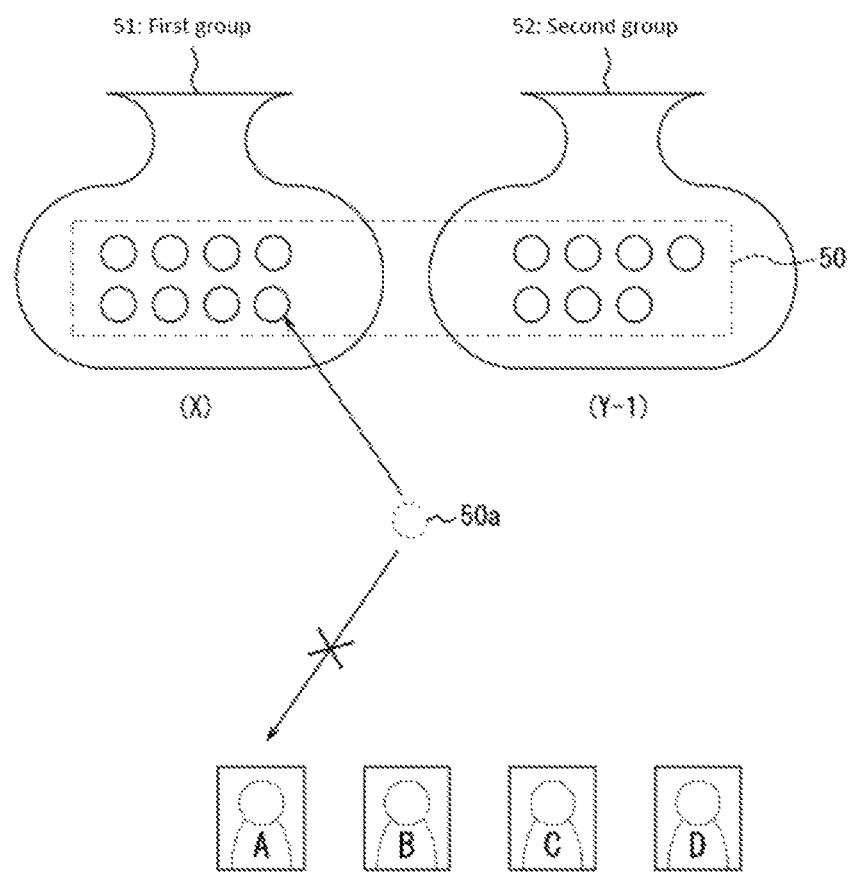

[FIG. 11]
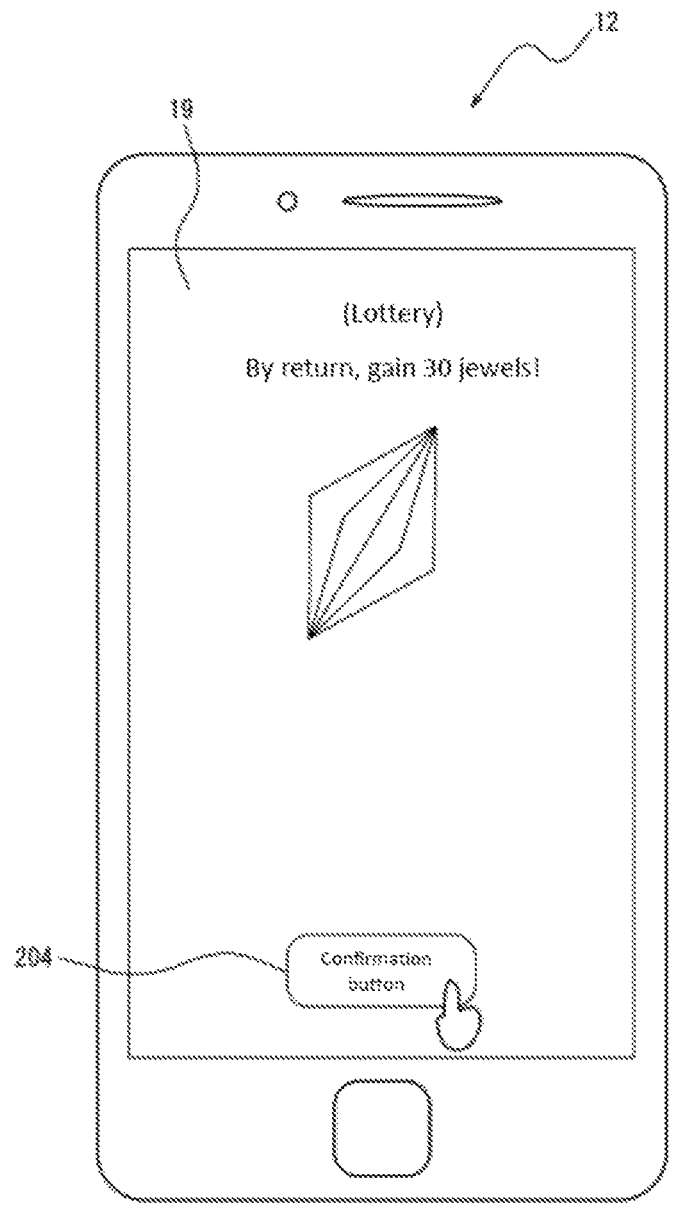

[FIG. 12]
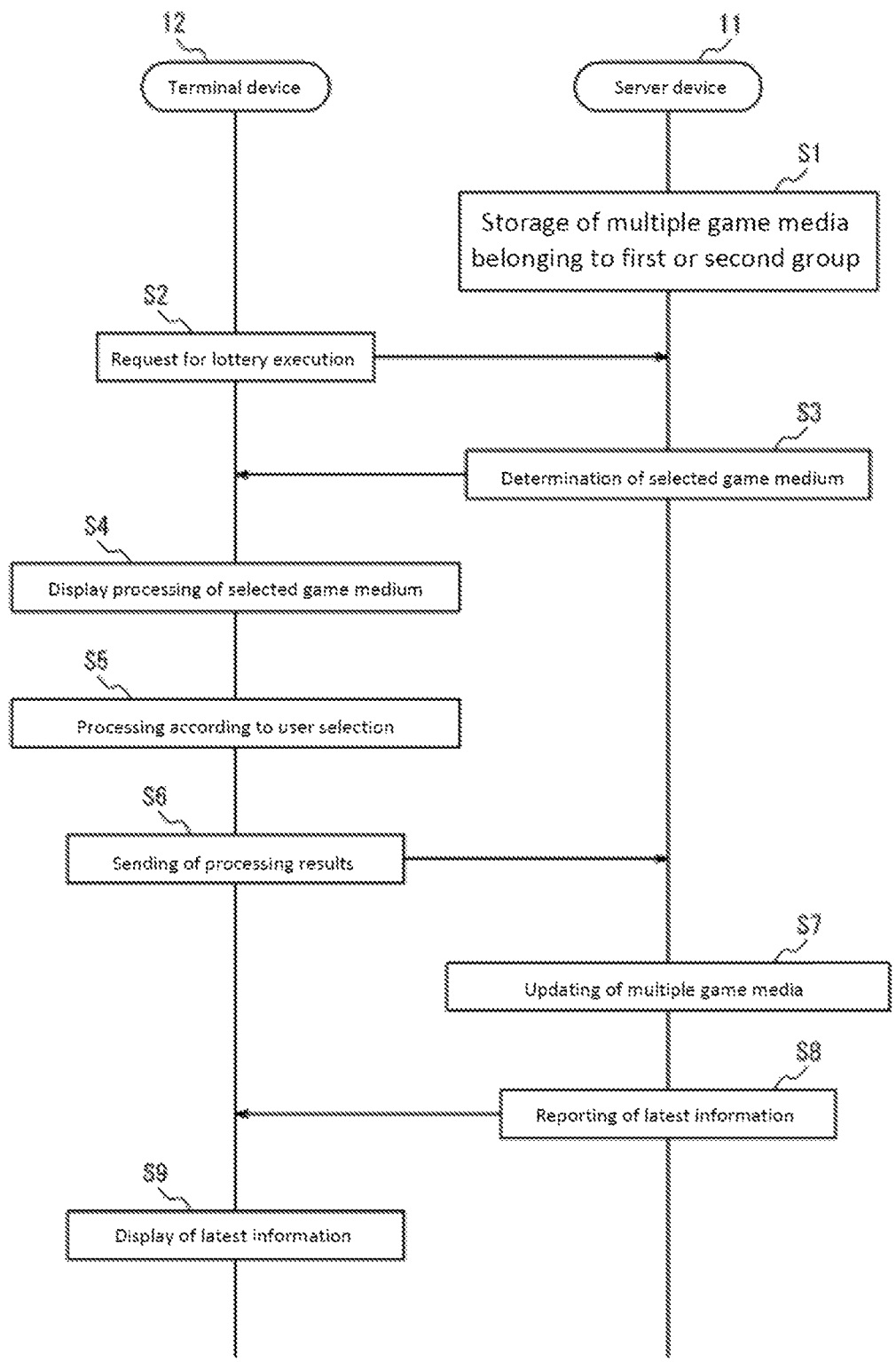

[FIG. 13]
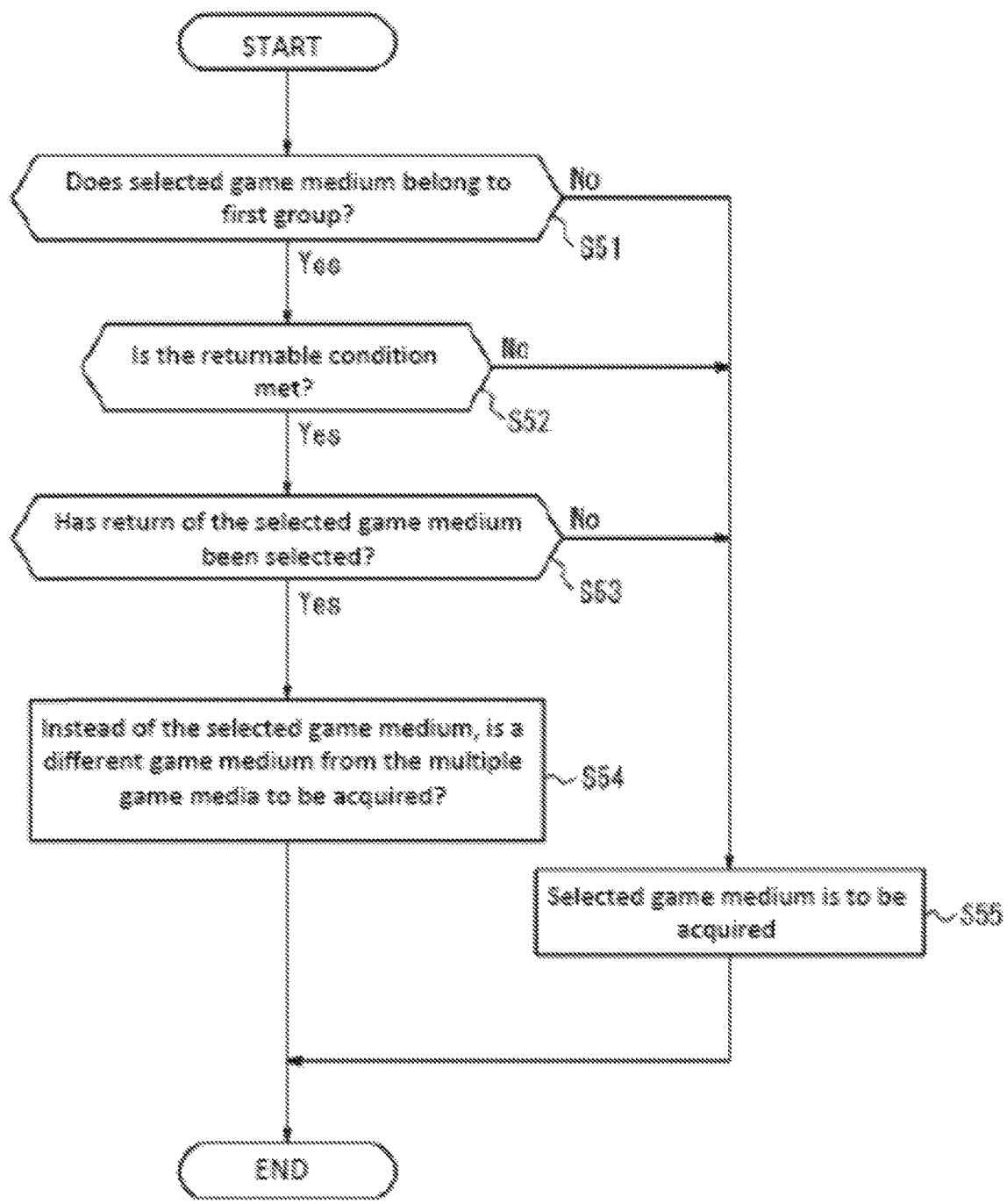

# NON-TRANSITORY COMPUTER-READABLE MEDIUM, CONTROL METHOD, SERVER DEVICE, AND TERMINAL DEVICE TO CARRY OUT LOTTERIES IN SOCIAL GAMES

CROSS-REFERENCE TO RELATED APPLICATIONS

This application claims the benefit of priority to JP 2017-208462, filed on Oct. 27, 2017, and the entire contents of which are incorporated herein by reference.

FIELD

The present disclosure concerns a non-transitory computer-readable medium, control method, server device, and terminal device.

BACKGROUND

In recent years, so-called "social games" have become known as games, provided to portable terminals via a communication network, that allow multiple players (users) to communicate with each other. Among social games are ones in which, for example, the user carries out a quest using a user-selected character or engages in battles with non-player characters (NPCs). For example, patent reference 1 describes fighting games in which a player character is manipulated to battle (fight) with opponents.

SUMMARY

Problems the Invention is to Solve

Some social games are made up of teams, called guilds, of multiple users, in which multiple characters operated by guild users (hereafter also called guild members) act together to fight battles or carry out duties. For guild members, the active interchange within the guild can be an important factor in increasing the interest in the game as a whole.

And a user can carry on a fight advantageously by using a character who is equipped with a strong item (with high fighting ability). A user can gain a strong item, for example, by selection by lottery within a game involving exchanging equivalent values (or without requiring equivalent values).

The purpose of this disclosure, which is made in consideration of the relevant circumstances, is to provide a program, control method, server device, and terminal device to facilitate interactions within guilds.

Means for Solving the Problems

A non-transitory computer-readable medium for one embodiment executes a step in which in a server device that has a memory unit and executes game-related processing, the memory unit associates and stores attribute information for multiple game media; a step in which a selected game content is determined from among the multiple game media based on a request from a user belonging to one team; a step in which, if the selected game content is a first selected game content whose attribute with which the selected game content is associated is of a specified content and the returnable condition is met, then the first selected game content is displayed to the user in a status in which the user can select the return or acquisition of the first selected game content; a step in which if the user has selected return of the first selected game content, then the memory unit stores, in association with the user, a game content that is different from the multiple game media; and a step in which, if the user has selected acquisition of the first selected game content, then the memory unit stores, in association with the user, the first selected game content.

A control method for one embodiment is a control method for a server device that has a memory unit and executes game-related processing, and includes a step in which the memory unit associates and stores attribute information for multiple game media; a step in which a selected game content is determined from among the multiple game media based on a request from a user belonging to one team; a step in which, if the selected game content is a first selected game content whose attribute with which the selected game content is associated is of a specified content and the returnable condition is met, then the first selected game content is displayed to the user in a status in which the user can select the return or acquisition of the first selected game content; a step in which if the user has selected return of the first selected game content, then the memory unit stores, in association with the user, a game content that is different from the multiple game media; and a step in which, if the user has selected acquisition of the first selected game content, then the memory unit stores, in association with the user, the first selected game content.

A server device for one embodiment is a server device that executes game-related processing and has a memory unit and a control unit, and the control unit associates and stores in the memory unit attribute information for multiple game media; determines a selected game content from among the multiple game media based on a request from a user belonging to one team; if the selected game content is a first selected game content whose attribute with which the selected game content is associated is of a specified content and the returnable condition is met, then it displays the first selected game content to the user in a status in which the user can select the return or acquisition of the first selected game content; if the user has selected return of the first selected game content, then it stores in the memory unit, in association with the user, a game content that is different from the multiple game media; and if the user has selected acquisition of the first selected game content, then it stores in the memory unit, in association with the user, the first selected game content.

A non-transitory computer-readable medium for one embodiment executes a step in which in a terminal device that has an input unit and a display unit and executes game-related processing, the input unit receives from a user belonging to one team a request that a selected game content be determined from among multiple game media; a step in which, if the selected game content is a first selected game content whose attribute with which the selected game content is associated is of a specified content and the returnable condition is met, then the display unit displays the first selected game content in a status in which the user can select the return or acquisition of the first selected game content; a step in which if the user has selected return of the first selected game content, then the display unit displays that a game content that is different from the multiple game media is associated with the user; and a step in which, if the user has selected acquisition of the first selected game content, then the display unit displays that the first selected game content is associated with the user.

A control method for one embodiment is a control method for a terminal device that has an input unit and a display unit and executed game-related processing, and includes a step in which the input unit receives from a user belonging to one team a request that a selected game content be determined from among multiple game media; a step in which, if the selected game content is a first selected game content whose attribute with which the selected game content is associated is of a specified content and the returnable condition is met, then the display unit displays the first selected game content in a status in which the user can select the return or acquisition of the first selected game content; a step in which if the user has selected return of the first selected game content, then the display unit displays that a game content that is different from the multiple game media is associated with the user; and a step in which, if the user has selected acquisition of the first selected game content, then the display unit displays that the first selected game content is associated with the user.

A terminal device for one embodiment is a terminal device that executes game-related processing and has a memory unit, a display unit, and a control unit, and the control unit receives from a user belonging to one team a processing request that a selected game content be determined from among multiple game media, and if the selected game content is a first selected game content whose attribute with which the selected game content is associated is of specified content and the returnable condition is met, then it displays on the display unit the first selected game content in a status in which the user can select the return or acquisition of the first selected game content; if the user has selected return of the first selected game content, then it displays on the display unit that a game content that is different from the multiple game media has been associated with the user; and if the user has selected acquisition of the first selected game content, then it displays on the display unit that the first selected game content has been associated with the user.

Effects of the Invention

This disclosure makes it possible to present a program, control method, server device, and terminal device that execute lottery processing to activate interaction within guilds.

BRIEF EXPLANATION OF THE DRAWINGS

FIG. 1 This is a drawing that describes a game system having an information processing device relating to one embodiment.

FIG. 2 This is a drawing showing an example of information concerning users.

FIG. 3 This is a drawing showing an example of information on owned cards.

FIG. 4 This is a drawing showing an example of job information.

FIG. 5 This is a drawing showing an example of a guild battle screen.

FIG. 6 This is a drawing showing an example of screen on which a lottery is executed.

FIG. 7 This is a drawing for explaining lottery processing.

FIG. 8 This is a drawing showing an example of a screen of lottery results.

FIG. 9 This is a drawing for describing the processing of acquisition (receiving) in a lottery.

FIG. 10 This is a drawing for describing the processing of returning in a lottery.

FIG. 11 This is another drawing for describing the processing of returning in a lottery.

FIG. 12 This is a sequence diagram for the control method of a terminal device and server device relating to one embodiment.

FIG. 13 This is a flowchart showing the processing by a terminal device.

EMBODIMENTS FOR IMPLEMENTING THE INVENTION (Summary of the Game System)

As shown in FIG. 1, the game system 10 has a server 11 and multiple terminal devices 12. In FIG. 1, for simplicity three terminal devices 12 are pictured, but the number of terminal devices 12 may be one or more.

The server device 11 is, for example, an information processing device managed by a game operator. The terminal devices 12 are information processing devices used by a user, such as for example portable telephones, smartphones, tablet terminals, personal computers (PCs), or game devices or the like. The server device 11 and the terminal devices 12 are connected so they can communicate by a network 16, such as for example the Internet. For example, the server 11 and the terminal devices 12 operate together and carry out various game-related processing.

(Game Summary)

The games executed by the game system 10 include various game content. At least some of the game content among the various game content may be executed using a game content.

A game content, which is electronic data used in a game, can be obtained (acquired), owned, used, managed, exchanged, combined, strengthened, sold, abandoned, or given, etc. by a user within a game. For example, a game content includes any medium such as cards, items, virtual currency, tickets, characters, avatars, level information, status information, and parameter information (physical strength value, attack power, etc.), ability information (skills, abilities, curses, jobs, etc.), and so on. The modes of use of game media are not limited to what is explicitly set forth in the specification. As can be appreciated, physical strength values are also health points, for example.

In the following, unless otherwise explicitly stated, a "user-owned game content" indicates a game content with which a user is associated with a uniquely identifiable user ID as an owned game content. And to "give a game content to a user" indicates associating a game content with a user ID as an owned game content. Also, "selling a user-owned game content" indicates severing the association between a user ID and a user-owned medium and associating another game content (for example, virtual currency or an item or the like) with the user ID.

Game content is content that a user can play within a game; it includes, for example, quests, missions, minigames, the growing, strengthening, and combining of game media, game content gaining events, virtual space searching events, and fighting events with fighting opponents (for example, other users, enemy characters, and enemies' buildings and the like), etc. For example, if it is judged that one or more specified conditions (game tasks) to be set for each game content have been successfully reached, then for example the user may be given a game content or the like as a reward. As game tasks one can adopt any tasks corresponding to the game content, such as for example the task of winning a fight with an enemy character or the task of reaching a goal location within the virtual space. And accomplishing a specified task (a completed task) within one or more game tasks set in the game content is also called "clearing" the game content. If a user playing game content succeeds in accomplishing a completed task, the game content is judged to be cleared, and that game content can be ended.

Various game content may include single-play game content and multi-play game content. Single-play game content is game content (for example, one-person game content) that is carried out based on user operation for 1 terminal device 12 used by 1 user. Single-play game content is carried out by 1 terminal device 12 individually or by 1 terminal device 12 and the server device 11 cooperatively. On the other hand, multi-play game content is common game content of two or more users that is carried out based on user operation for two or more terminal devices 12 used respectively by the two or more users (for example, multiple-person game content). Common game content of two or more users may contain for example game content in which at least part of the progress treatment or treatment results, etc. of the game content is applied in common to the two or more users. Multi-play game content is carried out by two or more terminal devices 12 in cooperation, or by two or more terminals devices 12 in cooperation with the server device 11.

In this embodiment, a game includes game content in which fighting is done by a user operating a game content. In the following, such game content is also called fighting content. The game media used for fighting content is described as including a character owned by a user within a game, but is not limited to this. Also, a fighting opponent is described as including an enemy character such as for example a non-player character, but is not limited to this. For example, in multi-player game content, the game media operated by other user may be prescribed for fighting opponents.

For example, one fighting content of a game in this embodiment selects a fixed number of characters from user-owned characters. And a user fights with enemy characters in common with other user characters.

(Composition of the Server Device)

The server device 11 has a server communication unit 13, a server memory unit 14, and a server control unit 15.

A server communication unit 13 includes circuitry, such as, an interface that communicates with external devices, and sends and receives information, wirelessly or by wire. The server communication unit 13 may include, for example, a wireless LAN (Local Area Network) communication module or a wired LAN communication module, etc. The server communication unit 13 can send and receive information with terminal devices 12 over a network 16.

A server memory unit 14 includes, for example, a primary memory device and a secondary memory device. For example, the server memory unit 14 may contain semiconductor memory circuits or optical memory, etc. The server memory unit 14 stores various information and programs needed for providing and controlling games. At least part of the information and programs stored in the server memory unit 14 may be shared and synchronized with the terminal devices 12. For example, the server memory unit 14 stores information concerning one or more users.

Also, the server memory unit 14 may store information on enemy characters. Enemy characters are used as fighting opponents of the character used by the user in fighting. The enemy character information includes any information on enemy characters.

A server control unit 15 includes circuits such as at least one or the other among one or more general-purpose processors that realize specific functions by reading in specific programs, and one or more dedicated processors that specify specific processing. The server control unit 15 controls the operation of the server device 11 as a whole.

The server control unit 15 stores in the server memory unit 14 various information and programs needed for game processing. One may include in the information needed for game processing the above information concerning users, enemy character information, and information needed for carrying out fighting, etc.

The server control unit 15 sends and receives information via the server communication unit 13. For example, the server control unit 15 may send to terminal devices 12 at least part of the information stored in the server memory unit 14. In this way, the information stored in the server memory unit 14 and the information stored in the terminal devices 12 are shared and synchronized. The timing by which information is shared and synchronized includes, for example, the timing by which new information is stored in the server memory unit 14, and the timing by which information stored in the server memory unit 14 is updated, but the timing may be set arbitrarily.

The server control unit 15 executes game processing in cooperation with the terminal devices 12. The game processing may include, for example, processing for card acquisition by the user proceeding with a game scenario, processing for exchanging, selling, combining, etc. for acquired cards, and processing for equipping a character with an item associated with a card and fighting with enemy characters.

(Composition of a Terminal Device)

As shown in FIG. 1, a terminal device 12 has a terminal communication unit 17, a terminal memory unit 18, a display unit 19, an input unit 20, and a terminal control unit 21.

The terminal communication unit 17 includes circuits such as an interface that communicates with external devices wirelessly or by wire and sends and receives information. The terminal communication unit 17 may include, for example, a wireless communication module that complies with mobile communication standards such as LTE (Long Term Evolution) (registered trademark), a wireless LAN communication module, or a wired LAN communication module, etc. The terminal communication unit 17 can send and receive information with the server device 11 over the network 16.

The terminal memory unit 18 includes, for example, a primary memory device and a secondary memory device. For example, the terminal memory unit 18 may include a semiconductor memory circuit, a magnetic memory, or an optical memory, etc. The terminal memory unit 18 stores various information and programs need for game processing. For example, the terminal memory unit 18 may store part or all of the above information concerning users. Also, for example, the terminal memory unit 18 may store the above enemy character information. Part or all of such information is sent and received with the server device 11 by the terminal control unit 21.

The display unit 19 includes, for example, a display device such as a liquid crystal display or an organic EL display, etc., and associated circuitry. The display unit 19 can display various screens.

The input unit 20 includes, for example, circuits such as an input interface such as a touch panel that is provided integrally with the display unit 19. The input unit 20 can receive user input for a terminal device 12. In this embodiment, the display unit 19 and the input unit 20 are integrated together and constitute a touch panel display. The touch panel display, which has a transparent sensor layer that detects changes in electrostatic capacitance as an input unit 20, can detect the position that is touched by the user by detecting changes in the electrostatic capacitance. Also, the input unit 20 may include physical keys, and may further contain any input interface, such as a mouse or other pointing device.

The terminal control unit 21 includes circuits such as at least one of one or more general-purpose processors that realize specific functions by reading in specific programs, and one or more dedicated processors that specify specific processing. The terminal control unit 21 controls the operation of the terminal devices 12 a whole.

The terminal control unit 21 sends and receives information via the terminal communication unit 17. For example, the terminal control unit 21 sends and receives with the server device 11 information needed for game processing. For example, the terminal control unit 21 stores in the terminal memory unit 18 information that is received from the server device 11.

The terminal control unit 21 starts a game application corresponding to user operations. The terminal control unit 21 carries out game processing in cooperation with the server device 11. For example, the terminal control unit 21 causes display of various screens on the display unit 19. On the screen may be displayed, for example, a GUI (Graphic User Interface). The terminal control unit 21 can detect user operations that correspond to the screen.

(Information Stored in the Memory Unit)

FIG. 2 shows information 110 concerning users including at least three users. The information 110 concerning users is stored for example in the server memory unit 14 and is shared and synchronized with the terminal devices 12. In other words, the information 110 concerning users is stored in the terminal memory unit 18 of the terminal devices 12. The information 110 concerning users includes various user information. In this embodiment, the information 110 concerning users includes user IDs and information on cards they own (see FIG. 3). In other words, the information 110 concerning users associates multiple users with information 111 on the cards they respectively own.

As stated above, a user ID is information that can uniquely identify a user.

The information 111 on owned cards includes various information cards that users own within the game. If a card is acquired by a user, the acquired card is associated with the user. In this embodiment, the card is associated with an item. Items, which are a type of game content, include weapons, protective gear, accessories, potions, or the like that a character will wear or use in fighting. Thus the information 111 on owned cards includes information concerning the types and characteristics of the items that are associated with the card. Here, cards are not limited to cards that are associated with items.

FIG. 3 is a drawing showing an example of the details of the owned card information 111. FIG. 3 shows the information 111 on the cards owned by one user. The owned card information 111 includes data concerning card IDs, items, levels, realities, fighting characteristics, attack power, defense power, and skills. The owned card information 111 is not limited to what includes all this data. The owned card information 111 may include further data as well. For example, the owned card information 111 may also include the cost of each item associated with a card ID (cost for a character to be fitted with it). Also, for example, the owned card information 111 may include item classifications (for example, weapons, protective gear, or summons, etc.). Also, for some matters, additional detailed settings may be made. For example, attack power and defense power may be classified into physical and magical, and there may be separate settings for physical attack power, physical defense power, magical attack power, and magical defense power.

A card ID is an ID that uniquely identifies the card that a user owns. In the example in FIG. 3, unduplicated numerals are used as card IDs. In the following, a card whose card ID is 1 is designated as card 1.

An item is the designation of an item that is used in a game. In this embodiment, one item is associated with one card ID. In the example in FIG. 3, the items (item designations) are, for example, S, T, U, and V.

A level is information that indicates the degree of growth of an item. For example, the greater the value of the level is, the greater is the degree of growth of the item. The value of the level affects for example the maximum value of the fighting parameters (for example, the attack power and the defense power). In the example in FIG. 3, the level of item U is 10. The value of the level rises by the user strengthening items (causing them to grow), for example by combining them. Here, combining means the user merging an item together with other items within the game.

Rarity is information that indicates how scarce a card is. For example, the greater the value of its rarity, the scarcer a card is. Rarity may be kept fixed. Also, for rarity, the initial value may be set according to the card and may change according how the game is played by the user. Rarity affects the maximum value of the fighting parameters (for example, the attack power and the defense power). In the example in FIG. 3, numerals are used for rarity. Here, the notation of rarity is not limited to this. For example, letters like A, B, S, SS, and L may be used for rarity.

Fighting characteristics, which are characteristics concerning fighting or the like that an item has, is information that gives the superiority-inferiority relationship between items. In the example in FIG. 3, fire, water, wind, and the like are used as types of fighting characteristics. For example, an item that has fire fighting characteristics may be stronger against an attack from an item having wind fighting characteristics, and weaker against an attack from an item having water fighting characteristics.

Attack power and defense power, which are fighting parameters referred to in fighting within the game, are information giving the strength of an item. In this embodiment, each item has an attack power and a defense power. Here, the fighting parameters are not limited to attack power and defense power. The owned card information 111 may further include fighting parameters concerning the behavior of the game, such as for example its quickness.

Attack power is information indicating the strength of the attack in fighting by a character. Attack power affects, for example, the amount of damage inflicted on a fighting opponent by an attack by a character. The greater the value of the attack force is, the greater is the amount of damage done to the fighting opponent. Therefore the greater a character's attack power is, the more advantageous it is for clearing the game content.

Defense power is information indicating the strength of the defense in fighting by a character. Defense power affects, for example, the amount of damage sustained by a character due to an attack from a fighting opponent. The greater the value of the defense power is, the less damage is sustained from the fighting opponent. Therefore the greater a character's defense power is, the more advantageous it is for clearing the game content.

Here, one example is the numerical values of the attack power and defense power in FIG. 3. The attack power and the defense power are independent fighting parameters, each of which can be set independently.

Skill is a special effect than can be exhibited in fighting. Skill is set for each card. For example, with card 1, an attack can be made that damages all enemy characters in fighting. And with card 3, one can recover the physical strength value known as health points (HP) of one body of an ally character while fighting. In the example in FIG. 3, skills are set on all cards. But cards may be included that have no skills.

FIG. 4 is a drawing illustrating job information 112. Job information 112 for example is stored in the terminal memory unit 18 and is shared with the server device 11. Job information 112 includes data on the job ID, the job type, the character, and the level. Job information 112 is not limited to including all of this data. Also, the job information 112 may contain further data as well. For example, the job information 112 may further include skills that are connected to the job ID.

The job ID is an ID that uniquely identifies the job that a user owns (that is, the combination of job type and character). In the example in FIG. 3, what is used as the job ID is a combination of the roman letter "J" and unduplicated numerals.

The job type indicates the role of a character in the game, in particular the role in fighting. As shown in FIG. 3, for example a user's character can participate in fighting as a warrior. Also, for example, a user's character can participate in fighting as a magician. The job types are not limited to warrior and magician. For example, further job types may be included such as gunner, which specializes in long-range attack.

A character is a character that is owned by a user and is used in the game. In the example in FIG. 4, the characters are for example A and Z. Here, if for character A the job type is set to warrior, the job ID is managed as J1. And if for the same character A the job type is set to magician, the job ID is managed as J3. A character used in fighting is managed by one job ID according to the combination of job type and character.

A level is information that denotes the degree of growth in fighting of a job that is managed by one job ID. In this embodiment, a user can select one job that he owns and can increase the selected job level by giving an experience value that is obtained in fighting. According to the value of the level, effects may occur by which the specific value used in fighting changes. For example, if the level increases, the maximum value of the physical strength value (HP) may be made greater.

(Screen Display Example)

FIG. 5 is a drawing showing an example of a screen of guild fighting, which is one game content. In the example in FIG. 5, a user manipulates character A and fights with enemy character 30 together with three other of the user's characters, B, C, and D, who are guild members. The guild fighting screen is displayed on the display unit 19 of the respective terminal devices 12 of the guild members, including the user. Here, the number of guild members shown in FIG. 5 is one example. As another example, the number of guild members may total five persons or more. And as another example, there may be three or more guild members. Also, in this embodiment, guild fighting involves fighting by guild members with an enemy character 30, which is a non-player character. But guild fighting may involve fighting by guild members with other guild members.

As shown in FIG. 5, the guild fighting screen is made up of a field region 191 and a non-field region 192. The field region 191 is a region that displays the virtual space of the game. For example, an enemy character 30 and characters A, B, C, and D are displayed in field region 191. Also, near each character A, B, C, and D is shown a gauge of its physical strength value (HP). When damage is sustained by a character A, B, C, and D or by the enemy character 30, the physical strength is decreased by the amount of the damage. As long as the physical strength value is not zero, the character is in fighting status and can attack the enemy character 30. But a character whose physical strength value is zero goes into cannot-fight status. In this embodiment, the maximum physical strength value (the initial value if guild fighting begins) is set according to the ranks of the guild members. The ranks are set according to the experience value obtained by each guild member with, for example, a quest, a mission, and a mini-game. And, as above, the maximum value of the physical strength value is adjusted according to the job level.

For the guild members, one job is selected for each to own. In other words, for example as in FIG. 4, one job to be used in guild fighting is selected from among the multiple jobs owned by guild members. Here a job set previously in game-setting by a guild member may be used automatically in guild fighting. And each guild member is given items (here, especially weapons, protective gear, accessories, and potions, etc.) in a selected job. For example, as in FIG. 3, one or multiple items to be used in guild fighting are selected from multiple items owned by guild members. Fighting parameters in guild fighting are determined in accordance with the selected items, and usable skills are set. Here, items specified previously in game settings by guild members are automatically used in guild fighting. And, according to the job, there may be items that can or cannot be furnished.

By a guild chat, for example, guild members set a strategy for fighting with an enemy character 30. The strategy may include setting the position (advance guard or rear guard) of the character that each guild member manipulates. In the example in FIG. 5, characters A and B are in the advance guard, and characters C and D are in the rear guard. In this embodiment, in the rear guard for example the damage sustained and the damage inflicted on the enemy character 30 is half what it is in the advance guard. Therefore, in the example in FIG. 5, the advance-guard characters A and B are given a "sword" that has a high attack power. Meanwhile, in the example in FIG. 5, rear-guard characters C and D are given a "staff" whose attack power is low but has the effect of recovering its physical strength value. By pursuing fighting in accordance with a strategy that takes positioning into consideration, the victory rate in guild fighting can be increased.

The non-field region 192 is a region where images are displayed concerning operations by users. In the example in FIG. 5, the non-field region 192 displays an automatic operation button 32 and a behavior power gauge 34. For example, by the user tapping the automatic operation button 32 to turn it ON, character A is made able to carry on fighting automatically (carry on fighting without any manipulation by the user). And the behavior power gauge 34 shows the value of the behavior power that is consumed by a specified behavior (for example, the performance of a skill, etc.) in fighting. When the behavior power reaches zero, character A cannot perform a specified behavior in fighting. In this embodiment, behavior power recovers as time passes.

Here, by using a character that has a strong item (one with high ability in fighting), the user can advantageously pursue guild fighting. A user can gain string items by selecting by lottery within a game in which values are exchanged, for example.

(Lottery)

FIG. 6 is a drawing showing an example of a screen in which a lottery is executed. The lottery illustrated in FIG. 6, which is a lottery shared with guild members, can be carried out by just a user who belongs to one team (guild). The details are discussed below, but in this embodiment, the initial value (first number) of an item that is put out is determined. Then, as the user or other guild members execute a lottery, the total number of items (the modulus parameter) grows smaller.

The display 195 of an item is shown in the upper part of the screen where a lottery is carried out. In the display 195 concerning items, which display is an item that can be selected by lottery, strong items are presented to the user by which guild fighting can be advantageously pursued. In other words, the display 195 concerning items shows something in which an associated attribute is specified content (hereafter also called "specific item"). In this embodiment, the specified content is that the rarity (an example of an attribute) is 4 or greater. In other words, the specific item is a so-called showpiece item that motivates the user to carry out a lottery. In the example in FIG. 6, the display 195 concerning items shows an item of a staff labeled R in which the rarity is 4. The display 195 concerning items may further have a button 199 for displaying a table of items put out by lottery. By tapping button 199, the user can display all items that can be selected by lottery.

Shown in the middle of the screen for executing a lottery is the latest information 196 concerning the lottery. The latest information 196 shows the acquiring user and the designation of the specific item if a guild member acquires a specific item. In the example in FIG. 6, it is shown that user B has acquired item Q. In other words, in this embodiment, if a user who is a guild member acquires a specific item (the first selected game content), then the game system 10 notifies the other users belonging to the guild (team) that the specific item has been acquired. This can motivate other users belonging to the guild to carry out a lottery. And other users belonging to the guild can easily learn of the reduction in the number of specific items.

In the lower part of the screen for executing a lottery is shown display 197 concerning equivalent values and a lottery execution button 198. The display 197 for equivalent values shows to the user the equivalent value required for a lottery. In the example in FIG. 6, 5 items P are required for one lottery. It may be made so that item P can be acquired by, for example, the user participating in guild fighting, winning or being defeated in guild fighting, or logging in to a game. The user asks for execution of a lottery by tapping the lottery execution button 198. In other words, the screen for executing a lottery is a screen for a terminal device 12 to receive a lottery request from a user. In this embodiment, the server device 11 decides upon a selected item from among multiple items based on a request from a user belonging to a guild (by tapping the lottery execution button 198 that is displayed in display unit 19 of a terminal device 12). And the server device 11 causes the selected item to be displayed on the display unit 19 of the terminal device 12 (see FIG. 8).

Here, in this embodiment, the server device 11 stores in server memory unit 14 as lottery-related information, multiple items to be used in a lottery (multiple items subject to lottery). Lottery-related information includes data concerning card IDs, items, realities, fighting characteristics, attack power, defense power, skills, and groups. Lottery-related information is stored, associated with attribute information (information on an attribute such as, for example, reality), in multiple game media (for example, items). Lottery-related information is not limited to including all this data. Also, lottery-related information may further contain other data. Here, a description is dispensed with, because this is the same (see FIG. 3) as the owned card information 111 on card IDs, items, realities, fighting characteristics, attack power, defense power, and skills. Here, lottery-related information may be shared with the terminal devices 12 of the guild members and stored in terminal memory unit 18.

A group is a group name to which multiple items subject to lottery belong (are classified). Multiple items subject to lottery each belong to a first group 51 or a second group 52 (see FIG. 7). In other words, for each of multiple items subject to lottery, information on whether the associated attribute is of a specified content (whether or not it is a specified item) is stored as lottery-related information. The details are discussed later, but lottery processing differs depending on whether a selected item belongs to the first group 51 or the second group 52. In this embodiment, the information processing devices (for example, the server device 11) can know, based on the lottery-related information, the total number of the multiple items that are subject to lottery, and the number of items belonging to each group.

In this embodiment, specific items (items whose associated attribute is specified content) belong to the first group 51. And items which are not specific items (items whose associated attribute is not specified content) belong to the second group 52. In this embodiment, whether it is a specific item is decided by the rarity. An item whose rarity is a specified value is greater than or equal to (for example, 4) is a specific item. The rarity of an item that belongs to the first group 51 is greater than the rarity of an item that belongs to the second group 52. And in this embodiment, the number of items that belong to the first group 51 is less than the number of items that belong to the second group 52. Here, as a separate example, for multiple items subject to lottery, the group to which they belong may be determined by elements other than rarity. For example, the group to which multiple items subject to lottery belong may be determined according to at least one of the fighting characteristics, the attack power, and the defense power.

Here, the card ID of lottery-related information is used as a lottery number. In other words, the card ID is used when a selected item is determined from among one or more items included in the lottery-related information. For example, the server device 11 acquires all card IDs from the lottery-related information. Then the server device 11 extracts one card ID, for example randomly, from among all the card IDs. The item associated with the card that has the extracted card ID becomes the selected item. In this embodiment, the information of the selected item acquired for the user is excluded from the lottery-related information. Then the information of the selected item is added to the information 111 of the card owned by the user (one guild member) for which a lottery has been executed. In this embodiment, by processing to exclude the selected card, the card ID can become discontinuous numerals. As a separate example, instead of the card ID, a continuous number indicating the order of the lottery may be used. At this time, instead of the card ID, the item associated with the card whose attached number is the smallest (or largest) becomes the selected item.

FIG. 7 is a conceptual diagram for describing the processing of a lottery carried out by an information processing device in this embodiment. The circles shown in FIG. 7 indicate multiple items 50 subject to lottery. The circles of multiple items 50 each indicate one item. As stated above, the multiple items 50 belong to the first group 51 or the second group 52. The server device 11 determines the selected item 50a when the execution of a lottery is requested by the user. Here, in example in FIG. 7, the selected item 50a is just one, but it may be multiple items.

As stated above, the lottery of FIG. 7 is shared by the guild members. FIG. 7 shows an example in which the user of character A (hereafter called user A), who is one of the guild members, requests execution of a lottery. If the selected item 50a belongs to the second group 52, the server device 11 excludes the selected item 50a from the lottery-related information of the server memory unit 14. In other words, the selected item 50a is excluded from the multiple items that are subject to lottery. As shown in FIG. 7, the number of items in the second group 52 changes from Y (for example 700) to Y−1 (for example 699). And the server device 11 adds the information of the selected item 50a to the card information 111 owned by user A. In other words, the selected item 50a is stored associated with user A. The updated card information 111 owned by user A is shared in the server memory unit 14 with the terminal devices 12 of user A. Also, the updated lottery-related information may be shared with the terminal devices 12 of the guild members and stored in the terminal memory unit 18.

FIG. 8 is a drawing showing an example of a lottery results screen. FIG. 8 is an example in which item R of rarity 4 is selected; in other words, it is an example of a screen in the case in which the selected item 50a belongs to the first group 51. The server device 11 causes the display units 19 of the terminal devices 12 to display a screen as shown in FIG. 8 if the selected item 50a is an item that belongs to the first group 51 and if the returnable condition, which is discussed below, is met. In other words, the server device 11 causes the display unit 19 of the user's terminal device 12 to display the selected item 50a in a state in which the user can select the return or acquisition of the selected item 50a. In the following, the selected item 50a, which belongs to the first group 51, is also called the first selected game content.

Item R, which is the selected item 50a, is displayed together with its image in the upper part of the lottery results screen.

Shown in the middle of the lottery results screen is a display 203 of the number of returnable times. The display 203 of the number of returnable times shows whether the returnable condition is met. As discussed below, the user is able not just to acquire (receive) the selected item 50a but to return it. But in this embodiment, the number of times the selected item 50a can be returned is limited to no more than a specified number of times (for example, 4 times). In the example in FIG. 8, it is shown by the display 203 of the number of returnable times that the remaining number of returnable times is 2 times. Accordingly, because the number of times the selected item 50a has been returned is less than or equal to the specified number of times (because the remainder is not 0 times), the returnable condition has been met.

In the lower part of the lottery results screen is shown a button 201 for acquiring, and a button 202 for returning, the selected item 50a. If the user taps button 201 for acquiring and selects acquisition of the selected item 50a, then as discussed below the server device 11 will perform the same processing as if the selected item 50a belongs to the second group 52.

And if the user taps button 202 for returning and selects return of the selected item 50a, then as discussed below the user will be given a different game content (for example, monetary currency within the game) from the multiple items subject to lottery.

FIG. 9, which is for example a continuation of FIG. 7, is a conceptual diagram for describing the processing if in the lottery carried out based on a request by user A the selected item 50a belongs to the first group 51 and user A taps button 201 in order to acquire it. Here, the same elements as in FIG. 7 are labeled with the same symbols, so an explanation is dispensed with.

Server device 11 excludes the selected item 50a from the lottery-related information of the server memory unit 14. In other words, the selected item 50a is excluded from the multiple items subject to lottery. As shown in FIG. 9, the number of items in the first group 51 changes from X (for example, 20) to X−1 (for example, 19). And the server device 11 adds the information on the selected item 50a to the information 111 concerning the card owned by user A. In other words, the selected item 50a is stored in association with user A. The updated information 111 concerning the card owned by user A is shared by the server memory unit 14 with the terminal unit 12 of user A. Also, the updated lottery-related information may be shared with the terminal devices 12 of guild members and stored in the terminal memory unit 18.

FIG. 10, which is for example a continuation of FIG. 7, is a conceptual diagram for describing the processing if, in the lottery carried out based on a request by user A the selected item 50a belongs to the first group 51 and user A taps button 202 in order to return it. Here, the same elements as in FIG. 7 are labeled with the same symbols, so an explanation is dispensed with.

The server device 11 makes no change concerning the lottery-related information of the server memory unit 14. In other words, as shown in FIG. 10, the number of items in the first group 51 remains at X (for example, 20). The server device 11 adds game content information that is different from the multiple items to game data that is different from the information 111 of the card owned by user A or from information 111 of the card (for example, the status record of user A). In other words, a game content that is different from the multiple items is stored in association with user A. The information 111 of the card owned by user A or the game data, which is updated by the server memory unit 14, may be shared with the terminal device 12 of user A.

FIG. 11 is another drawing for describing a return in a lottery. FIG. 11 is an example of a screen of the return results displayed on display unit 19 of the terminal device 12 of user A who requests execution of a lottery if return processing is carried out by the server device 11. Displayed in the upper part of the return results screen is a message indicating that 30 jewels have been gained in return for item R, which is the selected item 50a. Here, jewels are an example of the monetary currency within the game. Displayed in the lower part of the return results screen is a confirmation button 204. One may wait for the user to tap the confirmation button 204, and the server 11 may carry out an update of the above information 111 of the card owned by user A (or of the game data).

(Control Method)

FIG. 12 is a sequence diagram showing the processing (control method) concerning a lottery carried out by a terminal device 12 and the server device 11. Here, a specific example of the game explained below is an item.

First, the server device 11 stores in the server memory unit 14 multiple game media that belong to the first group 51 or the second group 52 (step S1). The server device 11 may, for example, set information concerning lotteries and store it in the server memory unit 14. And information concerning lotteries may be shared with the terminal devices 12 of guild members.

A user's terminal device 12 requests execution of a lottery (step S2). The user is a guild member. The request for execution of a lottery is made by the user tapping the lottery execution button 198 (see FIG. 6).

The server device 11 determines a selected game content (for example, a selection item) by, for example, a technique using the above card ID as a selection number (step S3).

The terminal device 12 executes display processing for the selected game content (step S4). In other words, the terminal device 12 causes display on the display unit 19 of the selected game content that has been determined by the server device 11.

The terminal device 12 executes processing according to the user's selection (step S5). Here, the user's selection varies depending on whether the selected game content belongs to the first group 51. The detailed processing by the terminal device 12 is described below.

The terminal device 12 sends to the server device 11 the processing results concerning step S5 (step S6). For example, if the user selects return or acquire for the user-selected item 50*a*, the terminal device 12 sends to the server device 12 whichever choice is selected by the user.

The server device 1 updates multiple game media that are subject to lottery (step S7). In other words, the server device 11 renews the content of the multiple game media if the selected item 50*a* is acquired. Here, the updating includes the selected item 50*a*, which belongs to the first group 51, being returned by the user and being stored in the server memory unit 14 without altering the lottery-related information.

The server device 11 reports the latest information (step S8). The server device 11 reports the latest information not only to the user who requested that a lottery be done, but also to the terminal devices 12 of the other guild members. The latest information is, for example, the content that is displayed as the latest lottery-related information 196 (see FIG. 6). In the example in FIG. 6, the latest information is that a guild member has acquired a specific item. Here, the latest information may be that a guild member has returned a specific item.

The terminal device 12 causes display on display unit 19 of the latest information from the server device 11 (step S9). In the example in FIG. 6, the latest information is displayed on a screen on which a lottery is executed. Here, the latest information may be displayed on another screen (for example, the guild chart).

FIG. 13 is a flowchart showing the lottery processing carried out by the terminal device 12 in accordance with the selection by the user. Here, the flowchart shown in FIG. 13 corresponds to step S5 in FIG. 12.

The terminal device 12 decides whether the selected game content determined by the server device 11 belongs in the first group 51 (step S51). If the selected game content belongs to the first group 51 (Yes in step 51), then the terminal device 12 proceeds to the processing of step S52. And if the selected game content does not belong to the first group 51 (No in step S51), in other words, if the selected game content belongs to the second group 52, then the terminal device 12 proceeds to the processing of step S55.

The terminal device 12 judges whether the returnable condition is met (step S52). The returnable condition is, for example, that the number of times the first selection game content (the first selection game content that belongs to the first group 51) has been returned is no greater than a specified number of times. The terminal device 12 proceeds to the processing of step S53 if the returnable condition is made (Yes in step S52). And if the returnable condition is not met (No in step S52), the terminal device 12 proceeds to the processing of step S55. For example, if the remaining returnable number of times is zero (see FIG. 8), the terminal device 12 proceeds to the processing of step 55, taking the returnable condition as not having been met.

The terminal device 12 judges whether return of the lottery game content has been selected by the user (step S53). If return of a selected game content has been selected (Yes in step S53), then the terminal device 12 proceeds to the processing of step S54. And if return of a selected game content has not been selected (No in step S53), in other words, if acquisition of a selected game content has not been selected, then the terminal device 12 proceeds to step S55.

For the user, the terminal device 12 executes processing for acquiring a game content (for example, monetary currency within the game) instead of the selected game content (step S54). For example, the terminal device 12 may make preparations to send to the server device 11 that return of the selected game content has been selected (see step S6 in FIG. 12).

Also, for the user the terminal device 12 carries out processing for acquiring a selected game content (step S55).

As stated above, the information processing devices in this embodiment (for example, the server device 11), have a memory unit (server memory unit 14) and a control unit (server control unit 15), and carry out processing concerning games. The control unit stores in the memory unit the multiple game media (for example, items) that belong to the first group 51 or the second group 52. The control unit determines the selected game content from among multiple game media based on a request from a user belonging to one team (guild). The control unit is made so that if a selected game content is a selected game content belonging to the first group 51 and the returnable condition is met (for example, if the remaining returnable number is zero), the user can select the return or acquisition of the first selected game content. At this time, the control unit causes display to the user the first selected game content. If the user selects return of the first selected game content, the control unit stores in memory unit, in association with the user, a game content (for example, monetary currency within the game) that is different from the multiple game media. And if the user selects acquisition of the first selected game content, the memory unit stores the first selected game content in association with the user, excluding the first selected game content from the multiple game media.

As stated above, to ensure the ability to win in guild fighting, the guild members establish a strategy, such as for example an advance guard and a rear guard. In this embodiment, a lottery is available that is shared by the guild members. Specific items that can be acquired by lottery are important items for improving fighting strength in guild fighting, and the number of them is limited (in the above example, to 20). Here, a specific item includes multiple types; there may be, for example, both a "sword" or the like that is suitable for the advance guard, and a "staff" that is suitable for the rear guard. In order to maximize the fighting force in guild fighting, it is desirable, for example, for the user of a character of the advance guard to obtain s specific item that is suitable for the advance guard, such as "sword".

In a lottery by the information processing devices relating to this embodiment, with the above composition the user can select the return or acquisition of multiple game media (specified items) that belong to the first group 51. Thus if for example a rear guard user selects a specified item such as a "sword" that is suitable for the advance guard, he can select return in order to turn over to an advance guard guild member the opportunity to make a selection. And by conveying, through a guild chat or the like, that a specific item has been returned, another guild member to whom the opportunity to make a selection has been transferred will more actively execute the lottery. And it is expected that information about the lottery results and the like will be exchanged. In other words, according to this disclosure it will be possible to more actively carry on exchanges within the guild by lotteries shared by the guild members.

Also, in this embodiment, a rear guard user who selects return will be given a game content that is different from the multiple items subject to lottery. Thus the state of the lottery (for example, the probability that a specified item will be put out, the total number of multiple items subject to lottery, etc.) is the same as the state before a rear guard user carries out a lottery. In other words, if return is selected, then without any change in the state of the lottery it will be possible to transfer the opportunity for being selected to another guild member. In other words, no disadvantage will arise such as a lowering of the probability of winning by a return.

Modification Examples, Etc.

This disclosure has been described based on various drawings and embodiments, but it should be noted that participants in the industry will easily make various modifications and revisions based on this disclosure. Therefore heed should be given that such modifications and revisions are included within the scope of this disclosure. For example, various means and various steps, etc. can be rearranged as long as the functions included in them do not logically conflict with each other, or multiple means or steps, etc. could be combined into a unit, or split up.

In the above embodiment, multiple items subject to lottery have not been supplemented midway. Here, if for example an item belonging to the second group is selected, other items belonging to the second group may be supplemented. For example, in the example shown in FIG. 7, a separate item belonging to the second group 52 may be supplemented instead of the selected item 50*a*, and the total number Y of items belonging to the second group 52 may remain unchanged. And the number of items belonging to the second group may be increased or decreased so that the probability of the selection of an item belonging to the first group is in a fixed range. By the timing for carrying out a lottery, it can be avoided that the selection probability for items belonging to the first group will differ greatly. If the selection probability differs greatly according to the timing, then for example a situation will arise in which all the guild members will avoid carrying out a lottery with early timing and will be averse to participating in lotteries. Such a situation can be prevented by increasing or decreasing the number of items belonging to the second group.

And in the above embodiment, if return of a first selected game content was selected, there was no change in the state of the lottery. Here, if, within a specified time period after a first selected game content is returned, a new selected game content is determined from among the multiple game media subject to lottery (if a lottery is newly carried out), the probability of the new selected game content belonging to the first group 51 (the probability that an item whose associated attribute is of a specified content, that is, a specific item, will be selected) may increase. For example, the probability that a specific item will be selected may be increased by the server device 11 temporarily reducing the number of items belonging to the second group during the above specified time period. Here, the specified time period may be a specific length of time (for example, 1 hour), or may be a specific number of lotteries (for example, 3 or fewer lotteries newly done after a return). If the probability that a specific item will be selected by return of a first selected game content increases, then it is expected that information about the return will be conveyed via guild chats or the like. In other words, exchanges within the guild will become even more active.

Also, in the above embodiment, no particular restrictions were imposed on changes to the guild with which a user is affiliated. Here, in order to provide a fair opportunity to be able to acquire an item that belongs to the first group, restrictions may be imposed on, for example, the behavior of a user who acquires an item and moves with it to another guild, and the behavior of returning an item after having moved to another guild. For example, it may be made impossible to change the guild one belongs to when such a lottery is carried out. Also, if for example a user moves to another guild, an item belonging to the first group which the owner has already acquired may be compulsorily lost. In other words, the server device 11 may compulsorily delete the association between the user and the item. And it may be made impossible for a user, after acquiring an item that belongs to the first group, to change the guild he is affiliated with.

Also, in the above embodiment, items whose associated attribute is of specified content belong to the first group, and items whose associated attributed is not of specified content belong to the second group. And the specified content is that the rarity is of a specified value (for example, 4) or greater. Here, the specified contest is not limited to using realities. For example, the specified content may be that the maximum value of the fighting parameters (for example, the attack power or the defense power) may be a specified value (for example, 5000) or greater.

Also, in the above embodiment, part of the game screen may be web-displayed, in which the display is made on the display unit 19 of the terminal device 12 based on data generated by the server device 11, and part of the game screen may be native-displayed, in which the display is made by a native application installed on the terminal device 12. In this way, in a game in the above embodiment, it is possible to make a hybrid game in which the terminal device 12 and the server device 11 each take on part of the processing. Also, in the above control method, part of the processing carried out by the terminal device 12 or the server device 11 may be done by another device.

Also, the server device 11 and the terminal device 12 may carry out various game-related processing in cooperation with each other. For example, the server device 11 and the terminal device 12 may share the burden in carrying out a series of processing. Also, for example, the server device 11 and the terminal device 12 may each carry out the same processing. In such same processing, the server device 11 and the terminal device 12 may complete the processing if the processing results agree between the server device 11 and the terminal device 12. If the processing results do not agree between the server device 11 and the terminal device 12, then the server device 11 and the terminal device 12 may complete the processing, taking the processing results of one of them (for example, the server device 11) to be correct. And, in another example, if the processing results do not agree between the server device 11 and the terminal device 12, the server device 11 and the terminal device 12 may wind back to the process as it was before execution of this same processing. With such a composition, even if for example the communication quality between the server device 11 and the terminal device 12 temporarily declines, the probably is reduced that the processing will immediately be discontinued. And even if, in the terminal device 12, incorrect processing is done such as for example the rewriting of fighting parameters, the probability that the incorrect processing can be excluded is increased.

Also, for example a computer, portable telephone, or the like can be appropriately used in order to function as a terminal device 12 or a server device 11. In the terminal device 12 and the server device 11, a program describing how to realize each of the above functions can be stored in an accessible memory unit, and can be realized having a CPU read and execute the program.

EXPLANATION OF THE SYMBOLS 10 game system
11 server device
12 terminal device
13 server communication unit
14 server memory unit
15 server control unit
16 network
17 terminal communication unit
18 terminal memory unit
19 display unit
20 input unit
21 terminal control unit
30 enemy character
32 automatic operation button
34 behavior power gauge
50 multiple items
50a selected item
51 first group
52 second group
110 information concerning user
111 owned card information
112 job information
191 field region
192 non-field region
195 display concerning item
196 latest information
197 display concerning equivalent values
198 lottery execution button
201, 202 buttons
203 display of number of returnable times
204 confirmation button

The invention claimed is:

1. A server device, comprising:
a memory configured to store a program; and
a processor coupled to the memory and, based on the program, configured to carry out game-related processing, the processor being configured to:
store, in the memory, multiple game media in association with attribute information,
determine a selected game content from among the multiple game media based on a request from a user belonging to one team,
if the selected game content is a first selected game content whose associated attribute is of a specified content and a returnable condition is met:
cause display of the first selected game content to the user in a state in which the user can select return or acquisition of the first selected game content,
if the user selects return of the first selected game content, store, in the memory and in association with the user, a game content that is different from the multiple game media and notify another user in the one team that the selected game content has been returned, and
if the user selects acquisition of the first selected game content, store, in the memory and in association with the user, the first selected game content, and
if the selected game content is a first selected game content whose associated attributed is of the specified content and the returnable condition is not met, store, in the memory and in association with the user, the first selected game content.

2. The server device according to claim 1, wherein a rarity of a game content whose associated attribute is of the specified content is greater than a rarity of a game content whose associated attribute is not of the specified content.

3. The server device according to claim 1, wherein the processor is further configured to, if the user selects the acquisition of the first selected game content, inform other uses belonging to the one team that the first selected game content has been acquired.

4. The server device according to claim 1, wherein the returnable condition is that a number of times the first selected game content is returned is not greater than a specified number of times.

5. The server device according to claim 1, wherein, if a new selected game content is determined from among the multiple game media within a specified time period after the first selected game content is returned, a probability increases that an attribute associated with the new selected game content is of the specified content.

6. A control method for a server device that has a memory and a processor to carry out game-related processing, said control method comprising:
storing, in the memory, multiple game media in association with attribute information;
determining a selected game content from among the multiple game media base on a request from a user belonging to one team;
if the selected game content is a first selected game content whose associated attribute is of a specified content and a returnable condition is met:
displaying the first selected game content to the user in a state in which the user can select return or acquisition of the first selected game content,
if the user selects return of the first selected game content, storing, in the memory and in association with the user, a game content that is different from the multiple game media and notifying another user in the one team that the selected game content has been returned, and
if the user selects acquisition of the first selected game content, storing, in the memory and in association with the user, the first selected game content; and
if the selected game content is a first selected game content whose associated attributed is of the specified content and the returnable condition is not met, storing, in the memory and in association with the user, the first selected game content.

7. A non-transitory computer readable medium encoded with computer-readable instructions that, when executed by a processor, cause the processor to perform a control method comprising:
  storing, in the memory, multiple game media in association with attribute information;
  determining a selected game content from among the multiple game media base on a request from a user belonging to one team;
  if the selected game content is a first selected game content whose associated attribute is of a specified content and a returnable condition is met:
    displaying the first selected game content to the user in a state in which the user can select return or acquisition of the first selected game content,
    if the user selects return of the first selected game content, storing, in the memory and in association with the user, a game content that is different from the multiple game media and notifying another user in the one team that the selected game content has been returned, and
    if the user selects acquisition of the first selected game content, storing, in the memory and in association with the user, the first selected game content; and
  if the selected game content is a first selected game content whose associated attributed is of the specified content and the returnable condition is not met, storing, in the memory and in association with the user, the first selected game content.

8. A non-transitory computer-readable medium encoded with computer-readable instructions that, when executed by a processor of a terminal device that has an input circuit and a display, causes the processor to perform a method comprising:
  receiving, by the input circuit, a processing request from a user belonging to one team that a selected game content be determined from among multiple game media;
  if the selected game content is a first selected game content whose associated attribute is of a specified content and a returnable condition is met:
    causing display, in the display, the first selected game content in a state in which the user can select return or acquisition of the first selected game content,
    if the user selects return of the first selected game content, causing display of, in the display, a game content that is different from the multiple game media is associated with the user and notifying another user in the one team that the selected game content has been returned, and
    if the user selects acquisition of the first selected game content, causing display of, in the display, an indication that the first selected game content is associated with the user; and
  if the selected game content is the first selected game content whose associated attributed is of the specified content and the returnable condition is not met, causing display of, in the display, an indication that the first selected game content is associated with the user.

9. A control method for a terminal device that has an input circuit and a display and carries out game-related processing, the control method comprising:
  receiving, by the input circuit, a processing request from a user belonging to one team that a selected game content be determined from among multiple game media;
  if the selected game content is a first selected game content whose associated attribute is of a specified content and a returnable condition is met:
    causing display of, in the display, the first selected game content in a state in which the user can select return or acquisition of the first selected game content,
    if the user selects return of the first selected game content, causing display of, in the display, a game content that is different from the multiple game media is associated with the user and notifying another user in the one team that the selected game content has been returned, and
    if the user selects acquisition of the first selected game content, causing display of, in the display, an indication that the first selected game content is associated with the user; and
  if the selected game content is the first selected game content whose associated attributed is of the specified content and the returnable condition is not met, causing display of, in the display, an indication that the first selected game content is associated with the user.

10. A terminal device that carries out game-related processing, comprising:
  an input circuit;
  a display; and
  a control circuit configured to
  cause the input circuit to receive from a user belonging to one team a processing request to determine a selected game content from among multiple game media,
  if the selected game content is a first game content whose associated attribute is of a specified content and a returnable condition is met:
    cause the display to display the first selected game content in a state in which the user can select return or acquisition of the first selected game content,
    if the user selects return of the first selected game content, cause the display to display a game content that is different from the multiple game media has been associated with the user and notify another user in the one team that the selected game content has been returned, and
    if the user selects acquisition of the first selected game content, cause the display to display that the first selected game content is associated with the user, and
  if the selected game content is the first selected game content whose associated attributed is of the specified content and the returnable condition is not met, causing the display to display that the first selected game content is associated with the user.

* * * * *